United States Patent [19]

Kotani et al.

[11] Patent Number: 5,754,909
[45] Date of Patent: May 19, 1998

[54] CAMERA WITH BOTH REMOVABLE APERTURE AND SPOOL CHAMBER COVER AND CARTRIDGE COVER

[75] Inventors: Noriyasu Kotani, Okegawa; Koichi Daitoku, Sagamihara, both of Japan

[73] Assignee: Nikon Corporation, Tokyo, Japan

[21] Appl. No.: 759,840

[22] Filed: Dec. 2, 1996

Related U.S. Application Data

[63] Continuation of Ser. No. 588,225, Jan. 18, 1996, abandoned, which is a continuation of Ser. No. 456,387, Jun. 1, 1995, abandoned, which is a continuation of Ser. No. 400,191, Mar. 6, 1995, abandoned, which is a continuation of Ser. No. 284,286, Aug. 2, 1994, abandoned, which is a continuation of Ser. No. 143,248, Oct. 29, 1993, abandoned, which is a continuation of Ser. No. 556, Jan. 4, 1993, abandoned, which is a continuation of Ser. No. 757,819, Sep. 11, 1991, abandoned.

[30] Foreign Application Priority Data

Sep. 11, 1990 [JP] Japan .................... 2-240983
Sep. 10, 1991 [JP] Japan .................... 3-258479

[51] Int. Cl.⁶ .................................. G03B 17/02
[52] U.S. Cl. .................................. 396/536; 396/538
[58] Field of Search .................. 396/439, 535, 396/536, 538

[56] References Cited

U.S. PATENT DOCUMENTS 4,669,845  6/1987  Ishiguro et al. ............... 396/536
4,752,797  6/1988  Sekine et al. ............... 396/535 X
4,832,275  5/1989  Robertson ................... 242/348.3
4,834,306  5/1989  Robertson et al. ........... 242/348.3
4,914,462  4/1990  Pagano ........................ 396/396
5,105,211  4/1992  Komeyama ................... 396/536

FOREIGN PATENT DOCUMENTS 949324     8/1956   Germany.
8 603 967  6/1990   Germany.
2 206 215  12/1988  United Kingdom.

OTHER PUBLICATIONS

Patent Abstracts of Japan, vol. 15, No. 515, Dec. 27, 1991.

Primary Examiner—Safet Metjahic
Assistant Examiner—J. K. Han

[57] ABSTRACT

A camera includes a cartridge chamber in which a film cartridge is loaded, a spool chamber in which a take-up spool is mounted, and an aperture disposed between the cartridge the chamber and the spool chamber. The camera has a mechanism which feeds film out of the cartridge by rotating a spool shaft of the cartridge loaded in the cartridge chamber, and leads the film past the aperture to the take-up spool. The camera is further provided with a cartridge cover for concealing the cartridge chamber when it is closed and for exposing the cartridge chamber when it is open. A rear cover which is openably mounted on the rear side of the camera body, conceals the aperture and the spool chamber when it is closed and exposes the aperture and the spool chamber when it is open.

20 Claims, 5 Drawing Sheets

CAMERA WITH BOTH REMOVABLE APERTURE AND SPOOL CHAMBER COVER AND CARTRIDGE COVER

This application is a continuation of application Ser. No. 08/588,225, filed Jan. 18, 1996, which is a continuation of application Ser. No. 08/456,387, filed Jun. 1, 1995, which is a continuation of application Ser. No. 08/400,191, filed Mar. 6, 1995, which is a continuation of application Ser. No. 08/284,286, filed Aug. 2, 1994, which is a continuation of application Ser. No. 08/143,248, filed Oct. 29, 1993, which is a continuation of application Ser. No. 08/000,556, filed Jan. 4, 1993, and which is a continuation of application Ser. No. 07/757,819, filed Sep. 11, 1991, all now abandoned.

BACKGROUND OF THE INVENTION

1. Field of the Invention

The present invention relates to a camera which feeds out a film by rotating a spool shaft of a cartridge, and more particularly to a camera having a cartridge cover for exposing and concealing a cartridge chamber.

2. Related Background Art

U.S. Pat. Nos. 4,832,275 and 4,834,306 each disclose a film cartridge which feeds out a film by a thrusting operation. The thrusting operation is an operation in which a film is fed outside a cartridge by rotating a spool shaft (with the film wound thereon) of the cartridge. In such a cartridge, since it is not necessary, when loading the film in a camera, to stretch and wind the film around a take-up spool by means of a manual manipulation thereof as in the conventional art, the loading can be performed easily.

A conventional camera capable of using such a cartridge has a mechanism for feeding out film by rotating a spool shaft of a cartridge loaded in a cartridge chamber, leading the fed film to a take-up spool through an aperture to wind the film on the take-up spool, and taking up the film by rotating the take-up spool.

In this kind of camera, since it is not necessary to stretch and wind the film on the take-up spool as described above, a conventional rear cover for exposing the cartridge chamber, the aperture and a spool chamber is unnecessary. In other words, a cover (cartridge cover) which conceals and exposes only the cartridge chamber will be sufficient. The cartridge cover makes it possible to facilitate the opening and closing operation of the cover and to prevent dust from intruding into a lens chamber and fingerprints from being placed on the rear face of a lens.

If the film goes out of its original path or the battery dies during the above thrusting operation, subsequent film feeding becomes impossible. In such an emergency, it is necessary to take the film out of the camera and reload the film. However, since the aperture and the spool chamber of the camera having only the cartridge cover are not exposed, it is very difficult to remove the film in the above-described emergency.

SUMMARY OF THE INVENTION

An object of the present invention is to provide a camera having a cartridge cover which makes it possible to easily remove film from of the camera when film feeding becomes impossible during the feeding operation.

In order to achieve the above object, a camera of the present invention shown in FIGS. 1A and 1B is comprised of a cartridge chamber 4 in which a film cartridge 5 is loaded, a spool chamber 6 in which a take-up spool 7 is mounted, and an aperture AP disposed between the cartridge chamber 4 and the spool chamber 6; The camera has a mechanism which feeds film out of the cartridge 5 by rotating a spool shaft of the cartridge 5 loaded in the cartridge chamber 4, and leads the film to the take-up spool 7 past the aperture AP. The camera further comprises a cartridge cover 21 for exposing and concealing the cartridge chamber 4, and a rear cover 23 which conceals the aperture AP and the spool chamber 6 when it is closed and which exposes the aperture AP and the spool chamber 6 when it is open.

If film feeding becomes impossible during a thrusting operation, the aperture AP and the spool chamber 6 are exposed by opening the rear cover 23, the film is taken out of the camera, and then it is loaded again.

Although the camera of the present invention is described with reference to the drawings illustrating its embodiments in order to clarify the description thereof, the present invention is not limited to these embodiments.

According to the present invention, since, in addition to the cartridge cover, the rear cover for exposing and concealing the aperture and the spool shaft is mounted on the camera body, it is possible to easily take the film out of the camera by opening the rear cover even if film feeding becomes impossible during a thrusting operation.

DETAILED DESCRIPTION OF THE PREFERRED EMBODIMENTS

A first embodiment of the present invention will now be described with reference to FIGS. 1A to 3.

Figure 1A:
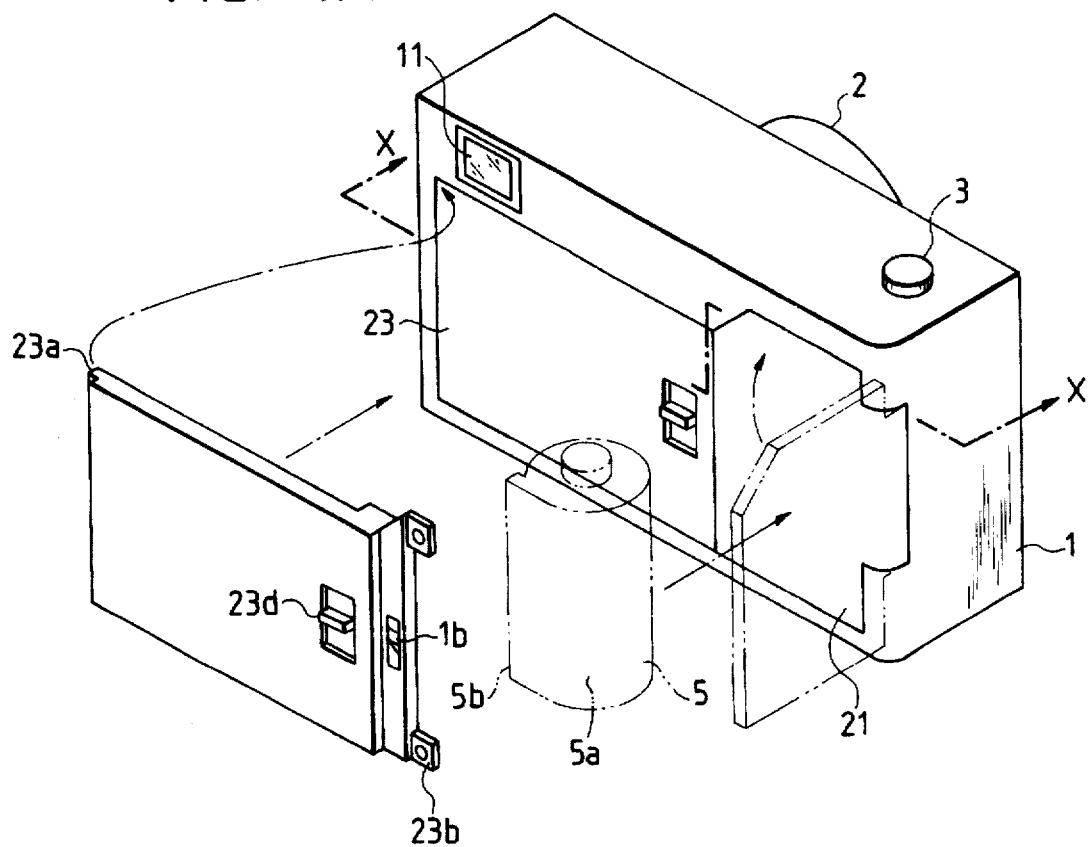
FIG. 1A is a perspective view of a camera as seen from behind according to a first embodiment of the present invention.
Figure 1B:
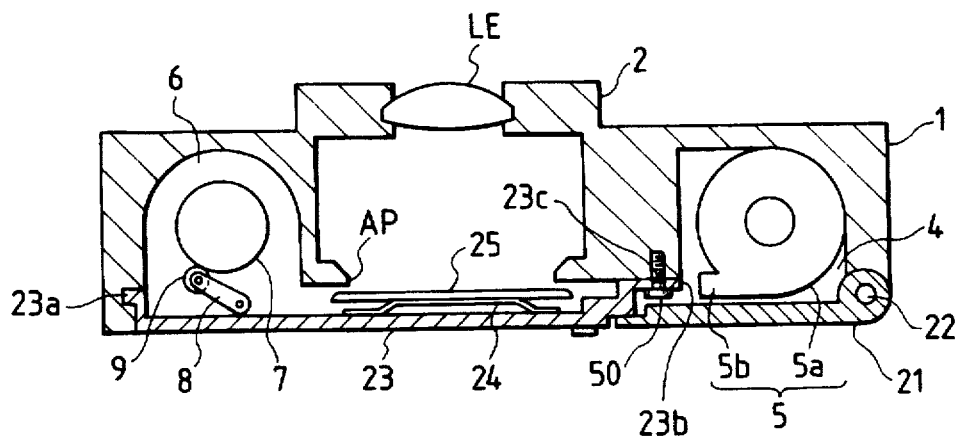
FIG. 1B is a cross-sectional view of the camera of the first embodiment along line X—X of FIG. 1A as seen from above.
Figure 2:
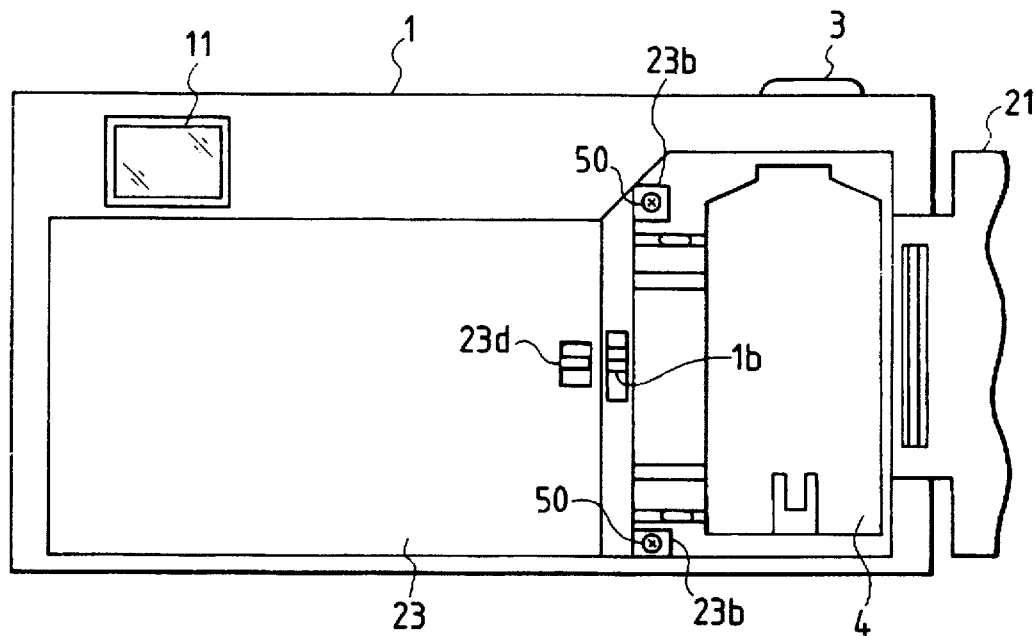
FIG. 2 is a rear view of the camera of the first embodiment when a rear exposure cover is closed.
Figure 3:
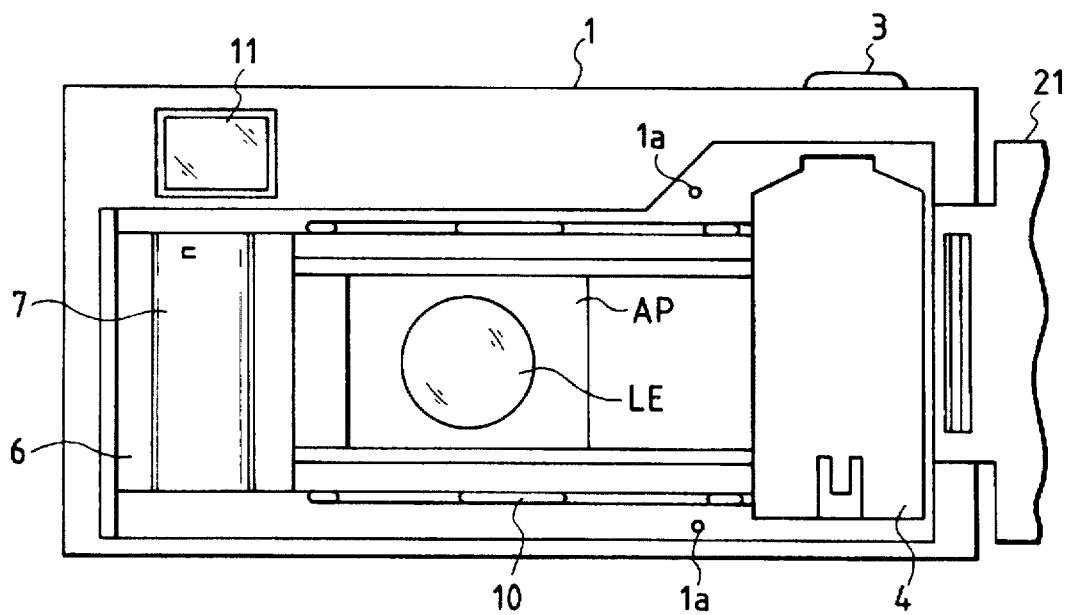
FIG. 3 is a rear view of the camera of the first embodiment when the rear exposure cover is opened.

FIG. 1A is a perspective view of a camera of the present invention as seen from behind, FIG. 1B is a cross-sectional view of the camera along line X—X shown in FIG. 1A as seen from above, and FIGS. 2 and 3 are rear views of the camera.

Referring to the drawings, numerals 1, 2 and 3 denote a camera body, a picture-taking lens barrel mounted at the front of the camera body 1, and a release button mounted on the top of the camera body 1, respectively. As shown in FIG. 3, a cartridge chamber 4, in which a film cartridge (referred to as just a cartridge hereinafter) 5 is loaded, is formed at one side in the camera body 1. The cartridge 5 is composed of a cylindrical portion 5a and a lip portion 5b projecting in the tangential direction of the cylindrical portion 5a. A roll of film wound on a spool shaft (not shown) is housed in the cylindrical portion 5a, and the leading end of the film in a linear state is located in the lip portion 5b.

Furthermore, a spool chamber 6 is formed at the other end in the camera body 1, and a take-up spool 7 is rotatably and pivotally supported in the spool chamber 6. An aperture (an opening for taking a picture therethrough) AP is placed between the spool chamber 6 and the cartridge chamber 4 opposite to a picture-taking lens LE in the lens barrel 2. A film presser roller (not shown in FIG. 3) 9 mounted at the leading end of a lockable lever 8 is pressed against the peripheral surface of the take-up spool 7 by an unillustrated spring member. Numerals 10 and 11 denote a film guide and an eyepiece of a finder, respectively.

A cover (cartridge cover) 21 for exposing and concealing the above cartridge chamber 4 is openably attached to the rear side of the camera body 1 through a hinge portion 22. When the cartridge cover 21 is closed, an engaging portion (not shown) inside the cartridge cover 21 is engaged with an engaging portion 1b of the camera body 1 (shown in FIGS. 1A and 2) and locked. The engagement is released by operating an operating portion 23d mounted on a rear cover 23, described below, and thus the cartridge cover 21 can be opened. When the cartridge cover 21 is opened, only the cartridge chamber 4 is exposed outside and the aperture AP and the spool chamber 6 are not exposed.

The rear side of the camera body 1 is also provided with a rear cover 23 besides the cartridge cover 21. The rear cover 23 is formed with a hook portion 23a (shown in FIG. 1B) engageable with an engaging portion of the camera body 1 on its one side, and a pair of upper and lower screw holes 23c on projections 23b on the other side. A presser plate 25 for pressing the film is attached to the inside of the rear cover 23 through a spring 24. The rear cover 23 is fixed by connecting the screw holes 23c and screw holes 1a (shown in FIG. 3) of the camera body 1 with screws 50 after engaging the hook portion 23a with the engaging portion of the camera body 1.

The aperture AP and the spool chamber 6 are concealed when the rear cover 23 is set (closed), and exposed when the rear cover 23 is not set (opened). As shown in FIG. 2, the screw holes 23a are concealed by the cartridge cover 21 when the cartridge cover 21 is closed.

The operations of this embodiment will now be described.

When the cartridge 5 is loaded in the cartridge chamber 4 and the cartridge cover 21 is closed, the spool shaft of the cartridge 5 is rotated by an unillustrated film feeding mechanism in correlation to the closing operation, and film is fed out from a feed outlet at the leading end of the lip portion 5b. In short, a thrust operation is performed. The fed film is led through between the aperture AP and the presser plate 25 to the take-up spool 7, and the leading end of the film is inserted between the take-up spool 7 and the presser roller 9. Subsequently, the film is wound in correlation to the rotation of the take-up spool 7.

If the film is not inserted between the roller 9 and the take-up spool 7, or is caught between the aperture AP and the presser plate 25 in the thrust operation for some reason, jamming of the film occurs, and subsequent film feeding becomes impossible. In such a case, a warning of the jamming is given by, for example, a liquid crystal display device.

In response to the warning, the user first opens the cartridge cover 21 so as to expose the screws 50 as shown in FIG. 2, removes the screws 50; releases the engagement of the hook portion 23a, and then detaches (opens) the rear cover 23 from the camera body 1. Since the aperture AP and the spool chamber 6 are thereby exposed as shown in FIG. 3, the film can be easily removed. After taking the film out, the film is rewound into the cartridge 5 and the cartridge 5 is reloaded.

Although the rear cover 23 is fixed by the screws 50 in the first embodiment, it may be fixed by, for example, a snap fitting, in which elastic fitting members are inserted so as to elastically support the rear cover 23. A second embodiment of the present invention which fixes the rear cover 23 by such a snap fitting will now be described with reference to FIGS. 4A and 4B.

Figure 4A:
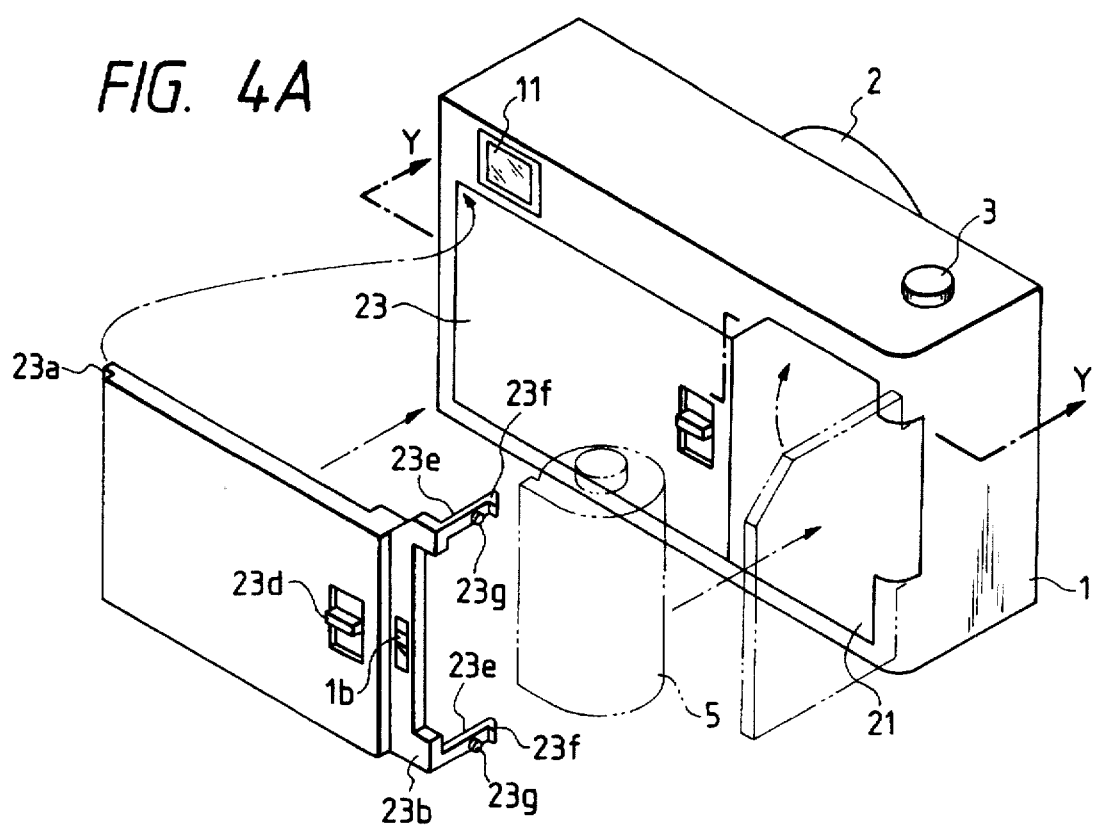
FIG. 4A is a perspective view of a camera as seen from behind according to a second embodiment of the present invention.
Figure 4B:
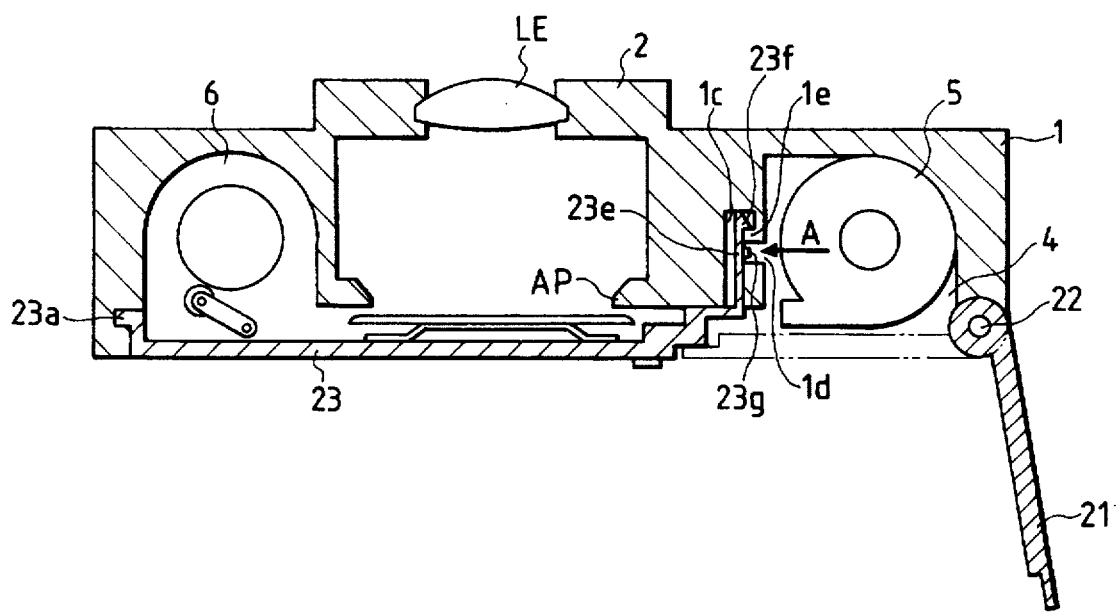
FIG. 4B is a cross-sectional view of the camera of the second embodiment along line Y—Y of FIG. 4A as seen from above.

FIG. 4A is a perspective view of a camera of the second embodiment as seen from behind. FIG. 4B is a cross-sectional view of the camera taken along line Y—Y shown in FIG. 4A as seen from above and shows the state in which the cartridge cover 21 is open. The description of the components denoted by the same numerals as those in the first embodiment is omitted.

As shown in FIG. 4A, the cartridge cover 21 is attached to the rear face of the camera through the hinge portion 22 so as to open backward. A pair of elastic engaging members 23e for snap fitting formed with hook portions 23f and hook release members 23g are disposed at the upper and lower ends of the projection 23b of the rear cover 23.

In the snap fitting, when the engaging members 23e are pressed into the holes 1c of the camera body 1 from behind as shown in FIG. 4B, the hook portions 23f are inserted against elasticity while being bent toward the aperture AP. The engaging members 23e are bent, and the hook portions 23f pass openings 1d formed on the side of the cartridge chamber 4 and are led to the holes 1c, and furthermore pass projections 1e formed inside the openings 1c. Then, the engaging members 23e are returned toward the cartridge chamber 4 by elasticity, and the hook portions 23f engage the projections 1e, thereby preventing the hook portions 23f from travelling rearward. After the hook portion 23a of the rear cover 23 is engaged with the engaging portion of the camera body 1, the rear cover 23 is fixed to the rear side of the camera body 1 by the snap fitting of the engaging members 23e. At this time, the hook release members 23g are placed inside the openings 1d of the camera body 1. By moving the hook release members 23g in the direction of the illustrated arrow A, the engaging members 23e are bent toward the aperture AP against elasticity, the engagement of the hook portions 23f and the projections 1e is released, and the rear cover 23 can be detached. The openings 1d and the hook release members 23g are concealed by the cartridge cover 21 until the cartridge cover 21 is opened, and therefore, cannot be operated from outside during a usual picture-taking operation.

The operations of this embodiment will be described. The portion of the description which is the same as that in the first embodiment, is omitted. When the jamming of the film is indicated, the user first opens the cartridge cover 21 so as to expose the openings 1d and the hook release members 23g, detaches the rear cover 23 by operating the hook release members 23g as described above, and then takes the film out.

Although the cartridge cover 21 is mounted on the rear side of the camera body 1 in the above two embodiments, third and fourth embodiments of the present invention in which the cartridge cover 21 is mounted at the bottom of the camera body 1 will now be described with reference to FIGS. 5A to 6B.

The third embodiment of the present invention will be explained with reference to FIGS. 5A and 5B. In the third embodiment, the cartridge cover 21 is mounted at the bottom of the camera body 1, and the rear cover 23 is fixed by screws 23j.

Figure 5A:
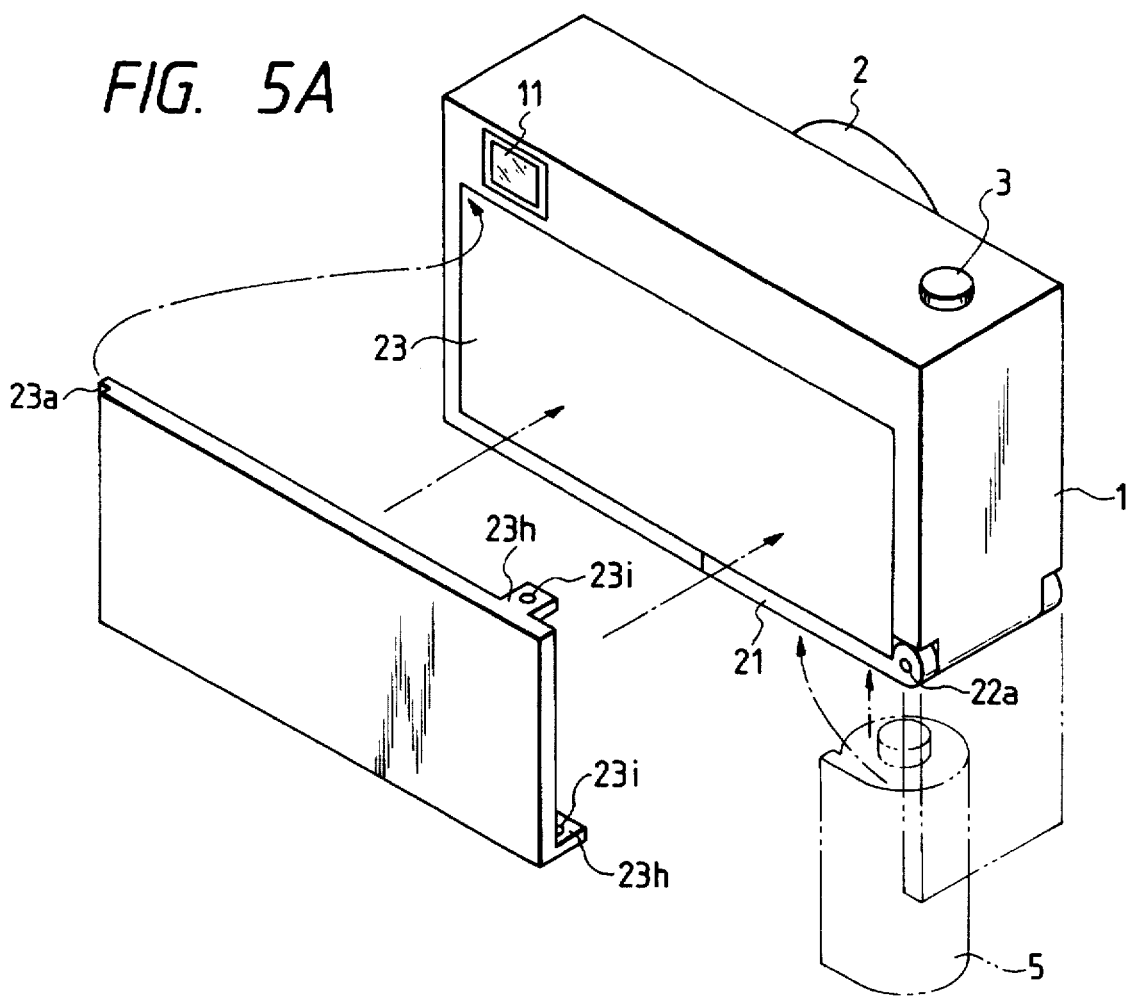
FIG. 5A is a perspective view of a camera as seen from behind according to a third embodiment of the present invention.

FIG. 5A is a perspective view of the camera of the third embodiment as seen from behind. FIG. 5B is a bottom view of the camera and shows the state in which the cartridge cover 21 is opened. The description of the components denoted by the same numerals as those in the other embodiments is omitted.

As shown in FIG. 5A, the rear cover 23 is adapted to cover almost the whole rear side of the camera body 1, and the cartridge cover 21 is attached to the bottom of the camera body 1 through the hinge portion 22a so as to open downward. The rear cover 23 has a hook portion 23a at one side thereof, and a pair of screw mounts 23h each having a screw hole 23i, which do not vertically align, in the upper and lower portions at the other side.

Figure 5B:
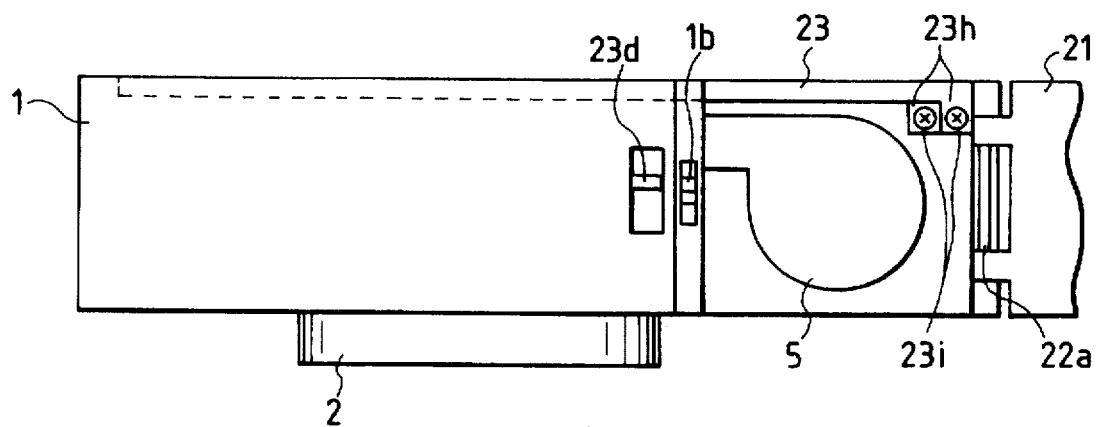
FIG. 5B is a bottom view of the camera of the third embodiment.

As shown in FIG. 5B, after the hook portion 23a of the rear cover 23 is engaged with the engaging portion of the camera body 1, the two screw mounts 23h are coupled to two corresponding screw holes (not shown) formed on the camera body 1 by screws 23j so as to fix the rear cover 23 to the rear side of the camera body 1 together with the hook portion 23a. The two screws 23j are normally concealed by the cartridge cover 21, and are exposed when the cartridge cover 21 is opened. A knob 23d and the engaging portion 1b serving as means for opening the cartridge cover 21, are formed at the bottom of the camera body 1.

The operations of this embodiment will be described. The portion of the description which is the same as that in the other embodiments is omitted. When jamming of the film is indicated, the user first operates the knob 23d, opens the cartridge cover 21 downward, exposes and takes exposes and takes out the two screws 23j by manipulation from below, and detaches the rear cover 23.

The fourth embodiment of the present invention will be described with reference to FIGS. 6A and 6B. In the fourth embodiment, the cartridge cover 21 is mounted at the bottom of the camera body 1, and the rear cover 23 is supported by snap fitting in the same manner as in the second embodiment.

Figure 6A:
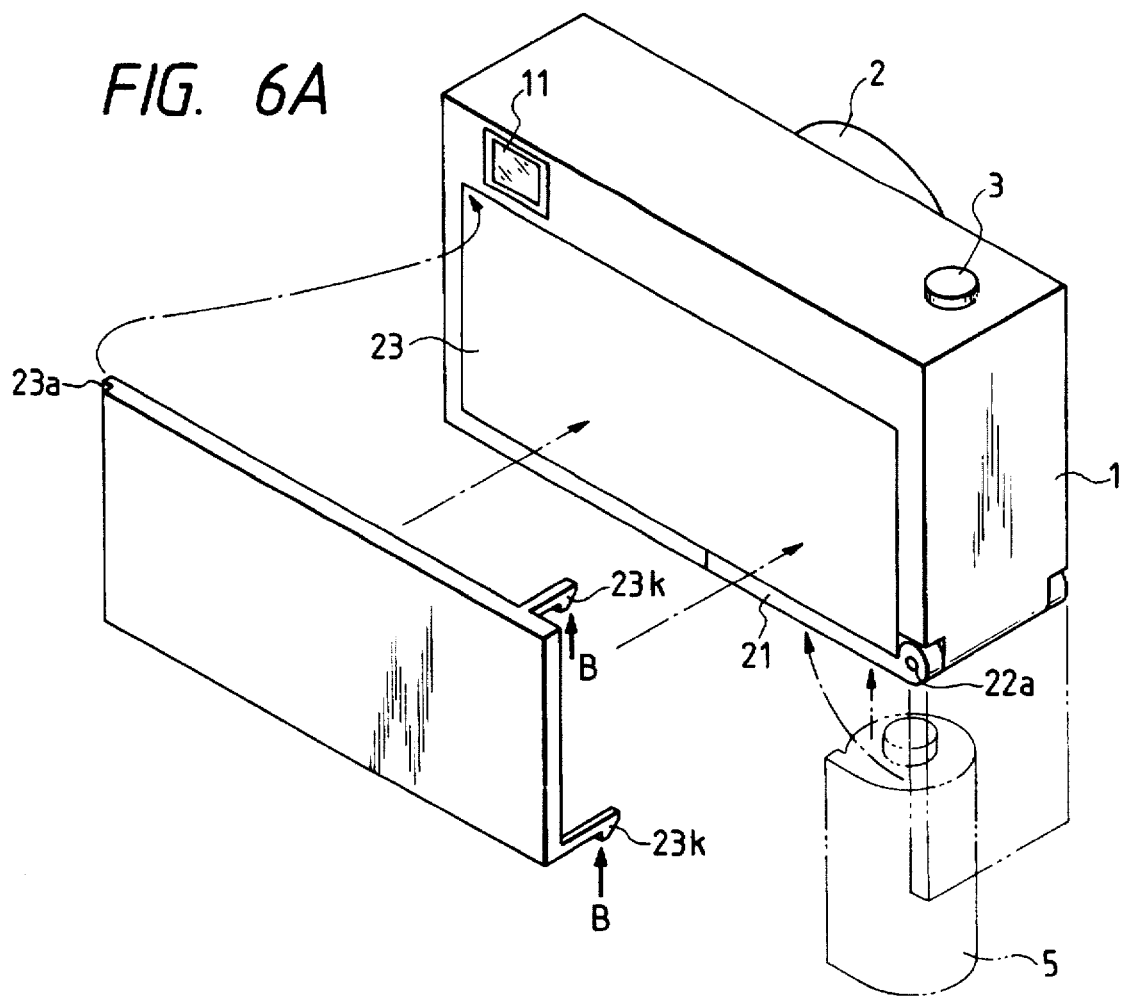
FIG. 6A is a perspective view of a camera as seen from behind according to a fourth embodiment of the present invention.

FIG. 6A is a perspective view of a camera of the fourth embodiment as seen from behind. FIG. 6B is a bottom view of the camera and shows the state in which the cartridge cover 21 is open. The description of the components denoted by the same numerals as those in the other embodiments is omitted.

As shown in FIG. 6A, the rear cover 23 is adapted to cover almost the whole rear side of the camera body 1, and the cartridge cover 21 is coupled to the bottom of the camera body 1 through the hinge portion 22a so as to open downward. Two engaging members for snap fitting each having a hook portion 23k and capable of bending in the direction of the illustrated arrow B, are mounted at the upper and lower portions at the side opposite to the hook portion 23a of the rear cover 23, and do not vertically align.

Figure 6B:
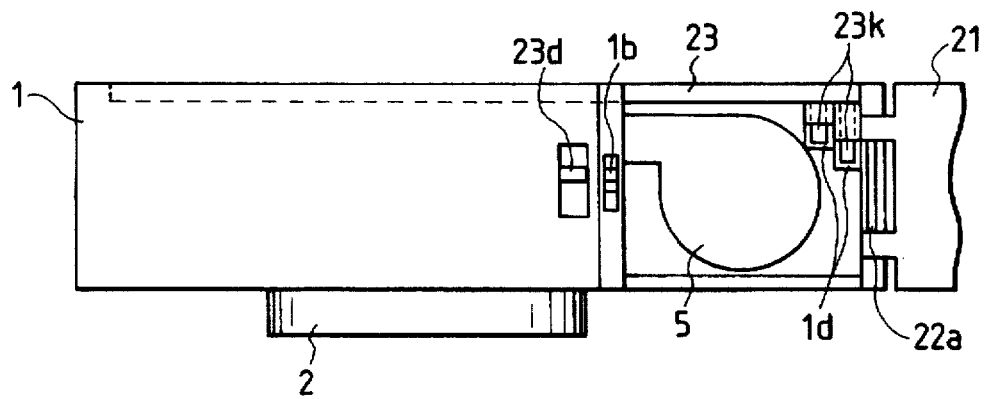
FIG. 6B is a bottom view of the camera of the fourth embodiment.

The hook portions 23k are pressed into the holes 1c (not shown) of the camera body 1 from behind as shown in FIG. 6B, are bent upward against elasticity, and pass the openings 1d formed on the side of the cartridge chamber 4. Then, the hook portions 23k are returned downward by their own elasticity, and engage the sides of the openings 1d as illustrated, thereby preventing the hook portions 23k from coming out rearward. After the hook portion 23a of the rear cover 23 is engaged with the engaging portion of the camera body 1, the rear cover 23 is fixed to the rear side of the camera body 1 by the snap fitting of the hook portions 23k. At this time, when the engagement of the hook portions 23k and the sides of the openings 1d is released in order to detach the rear cover 23, the hook portions 23k are operated from below. In other words, the hook portions 23k are pressed upward (in the direction of the arrow B shown in FIG. 6A) through the openings 1d to be freed, and the rear cover 23 is pulled rearward, and thus detached. The openings 1d and the hook portions 23k can be exposed and operated only when the cartridge cover 21 is opened. The knob 23d and the engaging portion 1b serving as means for opening the cartridge cover 21 are also formed at the bottom of the camera body 1 in the same manner as in the third embodiment.

The operations of this embodiment will now be described. The portion of the description which is the same as that in the first embodiment is omitted. When jamming of the film is indicated, the user first operates the knob 23d, opens the cartridge cover 21 downward so as to expose the hook portions 23k, and detaches the rear cover 23 by operating the hook portions 23k as described above. After that, the film is taken out.

Since the rear cover 23 can be opened only when the cartridge cover 21 is open in the above four embodiments, it is possible to prevent the film from being exposed due to inadvertent opening of the rear cover 23. In order to prevent such inadvertent opening of the rear cover 23, a plate or the like capable of concealing the screws or the snap fitting portions may be mounted on the side of the camera body 1.

Although the rear cover 23 is detachable in the above embodiments, it may be opened and closed on hinges in the same manner as the cartridge cover 21. Furthermore, it is possible to engage an engaging portion formed on the rear cover 23 with a slot formed on the camera body and to detach the rear cover 23 by releasing the engagement. Still furthermore, if the rear cover 23 can expose and conceal the aperture AP and the spool chamber 6, the shape of the rear cover 23 is not limited to the above embodiments.

What is claimed is:

1. A camera comprising:
   a cartridge chamber in which a film cartridge having a spool shaft is loaded;
   a spool chamber in which a take-up spool is mounted;
   an aperture disposed between said cartridge chamber and said spool chamber, film being fed out of the film cartridge by rotating the spool shaft of the film cartridge and led to the take-up spool past said aperture;
   a cartridge cover for concealing said cartridge chamber when it is closed and exposing said cartridge chamber when it is open;
   a rear cover openably mounted on the rear side of said camera for concealing said aperture and said spool chamber when it is closed and exposing said aperture and said spool chamber when it is open; and
   a fastener to hold said rear cover closed, said cartridge cover concealing said fastener when it is closed and exposing said fastener when it is open.

2. A camera according to claim 1, wherein said rear cover can be opened only when said cartridge cover is open.

3. A camera according to claim 1, wherein said fastener comprises rear cover opening means capable of being operated only when said cartridge cover is open.

4. A camera according to claim 1, wherein said cartridge cover is mounted on the rear side of the body of said camera.

5. A camera according to claim 4, wherein said rear cover is detachable from said camera body.

6. A camera according to claim 4, wherein said fastener comprises a screw which engages said rear cover and said camera body.

7. A camera according to claim 6, wherein said rear cover is fixed to said camera body by inserting one end of said rear cover into a portion of said camera body and engaging the other end of said rear cover with said camera body by said screw.

8. A camera according to claim 4, wherein said fastener comprises an elastic fitting member formed on one of said rear cover and said camera body, wherein a hole is formed in the other of said rear cover and said camera body, and wherein said rear cover and said camera body are elastically engaged to each other by said elastic fitting member.

9. A camera according to claim 8, wherein said rear cover is fixed to said camera body by inserting one end of said rear cover into a portion of said camera body and elastically engaging the other end of said rear cover to said camera body by said elastic fitting member.

10. A camera according to claim 8, wherein said elastic fitting member is formed on said rear cover and the hole is formed on said camera body.

11. A camera according to claim 1, wherein said cartridge cover is mounted to the bottom of the body of said camera.

12. A camera according to claim 11, wherein said rear cover is detachable from said camera body.

13. A camera according to claim 11, wherein said fastener comprises a screw which engages said rear cover and said camera body.

14. A camera according to claim 13, wherein said rear cover is fixed to said camera body by inserting one end of said rear cover into a portion of said camera body and engaging the other end of said rear cover with said camera body by said screw.

15. A camera according to claim 11, wherein said fastener comprises an elastic fitting member formed on one of said rear cover and said camera body, wherein a hole is formed in the other of said rear cover and said camera body, and wherein said rear cover and said camera body are elastically engaged to each other by said elastic fitting member.

16. A camera according to claim 15, wherein said rear cover is fixed to said camera body by inserting one end of said rear cover into a portion of said camera body and elastically engaging the other end of said rear cover with said camera body by said elastic fitting member.

17. A camera according to claim 15, wherein said elastic fitting member is formed on said rear cover and the hole is formed on said camera body.

18. A camera comprising:
- a cartridge chamber for receiving a film cartridge;
- a spool chamber for receiving film after it is fed out of the film cartridge, said camera automatically loading the film cartridge for exposure by thrusting a leading portion of the film into said spool chamber;
- a first cover for concealing said cartridge chamber when it is closed and exposing said cartridge chamber when it is opened;
- a second cover for concealing said spool chamber when it is closed and exposing said spool chamber when it is opened; and
- a fastener to hold said second cover closed, said first cover concealing said fastener when said first cover is closed and exposing said fastener when said first cover is opened.

19. A camera according to claim 18, wherein said fastener comprises an elastic member formed on one of said second cover and said camera body, wherein a hole is formed in the other of said second cover and said camera body, and wherein said second cover and said camera body are elastically engaged by said elastic member.

20. A camera according to claim 19, wherein said second cover is fixed to said camera body by inserting one end of said second cover into a portion of said camera body and elastically engaging the other end of said second cover to said camera body by said elastic member.

* * * * *